2 Sheets--Sheet 1.

T. G. BILYEU.
Refrigerators for Transporting Fruits, &c.

No. 151,347. Patented May 26, 1874.

Witnesses:
H. A. Daniels.
O. H. Parris.

Inventor:
Samuel G. Bilyeu
By W. Purris Atty.

2 Sheets--Sheet 2.

T. G. BILYEU.
Refrigerators for Transporting Fruits, &c.

No. 151,347. Patented May 26, 1874.

Witnesses:
H. A. Daniels
O. K. Parris

Inventor:
Samuel G. Bilyeu
By W. Burris
Atty.

UNITED STATES PATENT OFFICE.

SAMUEL G. BILYEU, OF CHARLESTON, SOUTH CAROLINA, ASSIGNOR TO HENRIETTA M. BILYEU, OF SAME PLACE.

IMPROVEMENT IN REFRIGERATORS FOR TRANSPORTING FRUITS, &c.

Specification forming part of Letters Patent No. 151,347, dated May 26, 1874; application filed November 3, 1873.

*To all whom it may concern:*

Be it known that I, SAMUEL G. BILYEU, of Charleston, in the county of Charleston and State of South Carolina, have invented certain new and useful Improvements in Fruit-Refrigerators; and I do hereby declare the following to be a full, clear, and exact description of the invention, such as will enable others skilled in the art to which it pertains to make and use it, reference being had to the accompanying drawings, which form part of this specification, in which—

Figure 1:
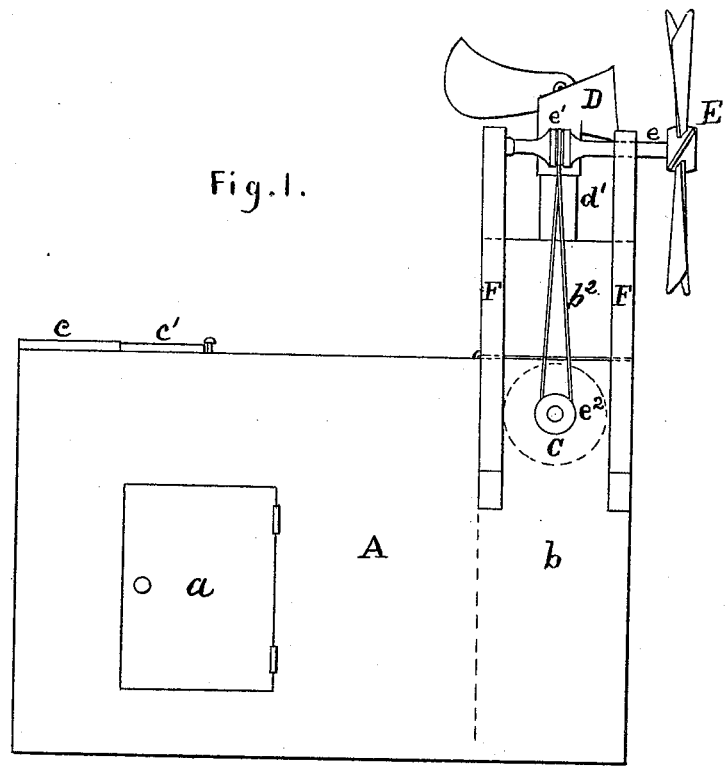
Figure 2:
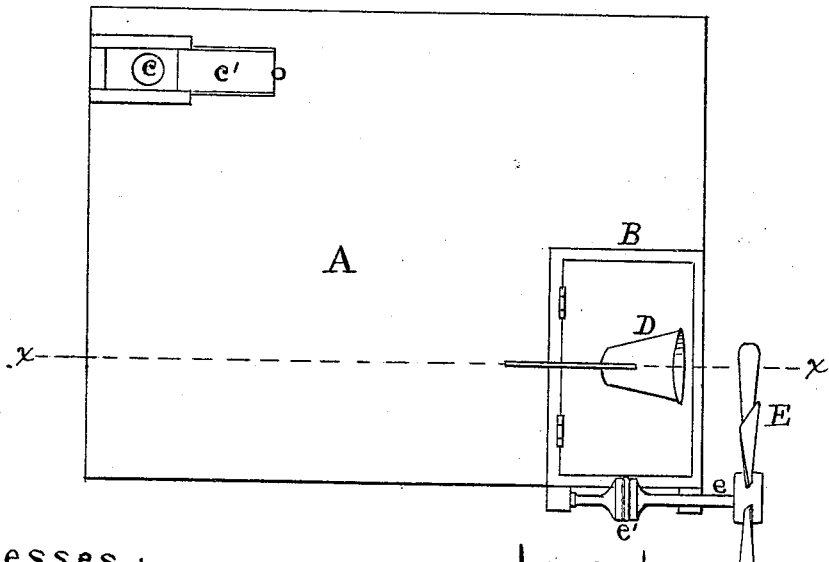
Figure 3:
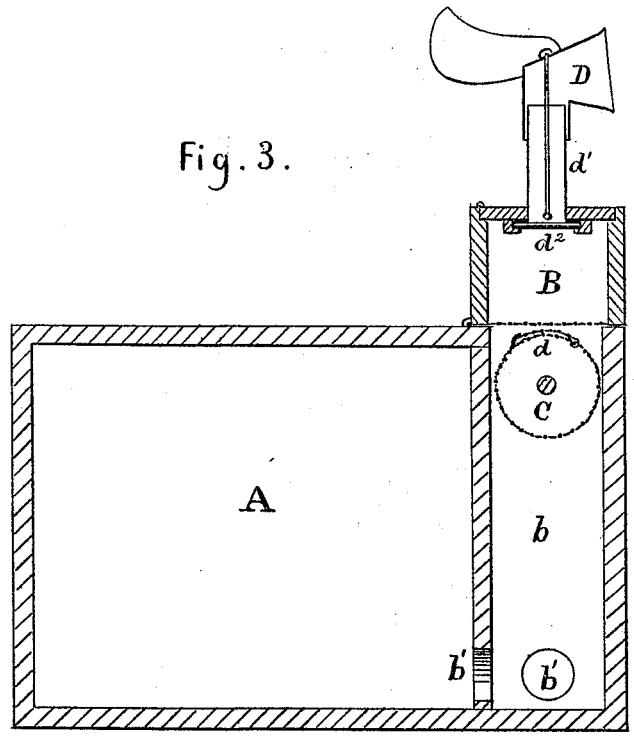
Figure 4:
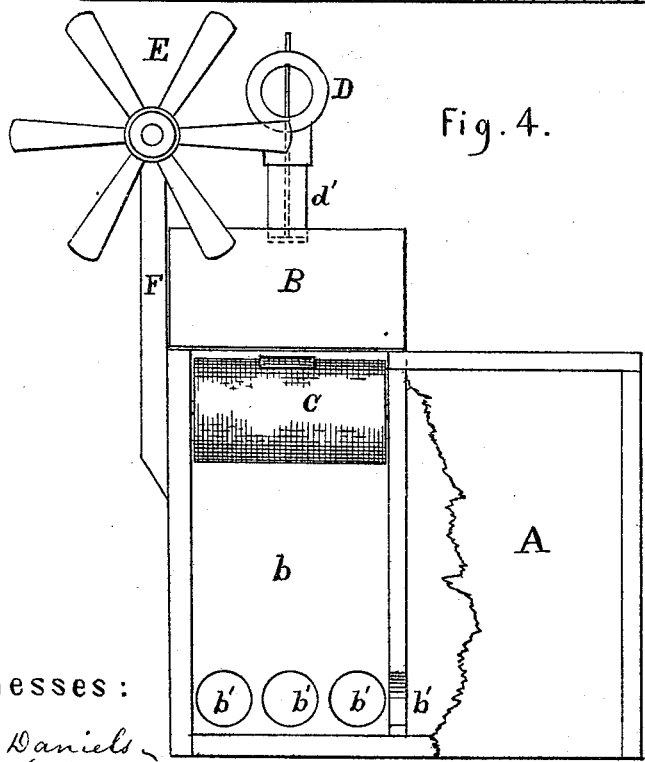

Figure 1 is a side elevation. Fig. 2 is a plan view. Fig. 3 is a section taken on line $x\ x$ of Fig. 2. Fig. 4 is an end elevation, with part of casing broken off to show the cylinder and air-passage.

My invention relates to that class of refrigerators in which fruits and vegetables are kept and conveyed to market in warm weather.

Those in use for that purpose confine the air closely within them, having no arrangements or devices for admitting fresh air, or for allowing the impure air to escape; and it has been found that the confining of fruits thus closely impairs their flavor.

My invention consists of a refrigerator provided with an ice-chamber, revolving cylinder, an automatic air-receiver, air-passage, and ventilator, all constructed and arranged so as to admit fresh air at the top of the refrigerator, and cool the air by passing it through the ice-chamber, and around the cylinder, and introduce it at the bottom, forcing the warm and impure air out through the ventilator at the top of the refrigerator.

The cylinder is to be filled with ice, and it is arranged to be revolved by windmill devices, operated by the force of air caused by the motion of the vessel or cars carrying the refrigerator, or by the motion of the wind when the refrigerator is stationary.

A represents the refrigerator, having door $a$ in the side, air-passage $b$ at the end, with holes $b^1\ b^1$ at the bottom, and ventilator $c$, provided with a sliding cover, $c'$, on the top of the refrigerator. B is an ice-chamber, having a grate or wire bottom and a hinged lid. The ice-chamber is hinged to the top of the refrigerator, so that it may be turned back to allow the ice to be placed in the cylinder. C is the cylinder, made of large wire, and is provided with a door, $d$, to receive the ice, and is arranged upon axles at the ends, having bearings in the sides of the refrigerator and air-passage. D represents an automatic air-receiver, attached to an air-conductor, $d^1$, which passes through and is attached to the lid of the ice-chamber, and is provided with a sliding damper, $d^2$. E represents a wind-wheel, attached to a shaft, $e$, having its bearings in the ends of standards F F, attached to the side of the refrigerator. On the shaft $e$ is a drum, $e^1$, carrying a band, $b^2$, extending over pulley $e^2$ on the end of the shaft of the cylinder, which has its bearings in the front side of the refrigerator and partition of the air-passage $b$.

Any other suitable devices may be employed for revolving and regulating the motion of the cylinder.

The ice-chest is turned back on its hinges to allow the ice to be placed in the cylinder through the opening $d$ in the side, which is closed by a hinged lid, and the cylinder is revolved to facilitate the process of cooling the air and passing it downward into the refrigerator.

The cylinder may be used without revolving it, which in that case will have the effect of aiding the process of cooling the air as it passes through and around the cylinder.

The air enters, through the automatic receiver D and conductor $d^1$, into the ice-chest B, and as it is cooled passes downward through the bottom of the chest, and around the ice-cylinder C, and through the air-passage $b$, and enters the refrigerator at the bottom through the holes $b^1\ b^1$, forcing the warm air upward and out of the refrigerator through the ventilator $c$.

The quantity of fresh air to be admitted into the refrigerator is regulated by the damper $d^2$ at the bottom of the conductor $d^1$, and the refrigerator may be closed entirely by closing up the conductor and ventilator; or the conductor may be closed, and the ventilator left open, or vice versa, as may be required.

What I claim as new, and desire to secure by Letters Patent, is—

1. In a refrigerator, the combination of the automatic receiver D, conductor $d^1$, air-passage $b$, and ventilator $c$, substantially as and for the purposes described.

2. The combination of the ice-chest B with the refrigerator A, automatic receiver D, conductor $d^1$, air-chamber $b$, and ventilator $c$, substantially as and for the purposes described.

3. The combination of the ice-cylinder C with refrigerator A, automatic receiver D, conductor $d^1$, air-chamber $b$, and ventilator $c$, substantially as and for the purposes described.

4. The combination of ice-chest B and ice-cylinder C with the refrigerator A, substantially as described.

5. In a refrigerator, the combination of the ice-cylinder C with the wind-wheel E, substantially as and for the purpose described.

In testimony that I claim the foregoing I have hereunto set my hand this 28th day of October, 1873.

SAMUEL G. BILYEU.

Witnesses:
R. S. LACY,
N. CHILDS.